United States Patent
Pham et al.

(10) Patent No.: US 7,649,046 B2
(45) Date of Patent: Jan. 19, 2010

(54) MODIFIED POLYPROPYLENE COMPOSITION

(75) Inventors: Tung Pham, Linz (AT); Norbert Reichelt, Neuhofen/Krems (AT); Manfred Stadlbauer, Linz (AT)

(73) Assignee: Borealis Technology Oy, Porvoo (FI)

( * ) Notice: Subject to any disclaimer, the term of this patent is extended or adjusted under 35 U.S.C. 154(b) by 254 days.

(21) Appl. No.: 11/629,945

(22) PCT Filed: Jun. 17, 2005

(86) PCT No.: PCT/EP2005/006535

§ 371 (c)(1),
(2), (4) Date: Jan. 29, 2007

(87) PCT Pub. No.: WO2005/123827

PCT Pub. Date: Dec. 29, 2005

(65) Prior Publication Data

US 2008/0287597 A1    Nov. 20, 2008

(30) Foreign Application Priority Data

Jun. 18, 2004   (EP)   ................................ 04102801

(51) Int. Cl.
*C08K 5/00*      (2006.01)
*C08J 3/22*      (2006.01)
*B01F 17/00*     (2006.01)

(52) U.S. Cl. .................. 524/515; 524/525; 524/528
(58) Field of Classification Search .............. 524/515, 524/525, 528

See application file for complete search history.

(56) References Cited

U.S. PATENT DOCUMENTS

| 6,077,907 A | 6/2000 | Raetzsch et al. |
| 2002/0082328 A1 * | 6/2002 | Yu et al. ............... 524/423 |
| 2004/0116607 A1 | 6/2004 | Malm et al. |

FOREIGN PATENT DOCUMENTS

| EP | 1 236 769 | 9/2002 |
| EP | 1236769 A1 * | 9/2002 |
| EP | 1 354 901 | 10/2003 |
| EP | 1 391 428 | 2/2004 |

* cited by examiner

*Primary Examiner*—Ling-Siu Choi
*Assistant Examiner*—Hui Chin
(74) *Attorney, Agent, or Firm*—Jordan and Hamburg LLP

(57) ABSTRACT

The invention relates to a polypropylene composition a heterophasic propylene copolymer, an elastomeric copolymer and inorganic filler and to a method for producing the propylene composition using peroxides. The composition is characterised by a combination of excellent impact strength, stiffness, elasticity and surface stability.

13 Claims, No Drawings

MODIFIED POLYPROPYLENE COMPOSITION

BACKGROUND OF THE INVENTION

The invention relates to novel modified polypropylene compositions, especially for automobile exterior applications. More particularly, the invention relates to modified polypropylene compositions comprising a heterophasic propylene copolymer, a further elastomeric copolymer and an inorganic filler. The modified composition has excellent properties, especially impact strength, stiffness, elasticity and surface stability.

The automotive market increasingly requires polypropylene compounds for car exterior applications having a performance which is not achievable with conventional compounding. One of the critical requirements for exterior applications in many cases is the high surface stability of the moulded parts which are painted such as bumper, body panels etc.

It is well known that the mechanical performance of polypropylene/rubber compounds is determined by the phase structure and thus composition morphology. With low molecular weight rubbers (reactor made and externally), the tensile elongation of the final filler compounds for typical exterior applications is improved. However, the low molecular weight rubber fraction causes unsatisfactory surface stability, which results in unsatisfactory paint adhesion.

The main reason for the low surface stability was identified to be in the surface structure of the moulded part. Studies (Moffitt et al; *J. Pol. Sci.* 40 (2002), 2842; Ryntz; *Proc. Org. Coat.* 27 (1996), 241)) have shown that when a polypropylene/rubber system is injection moulded, the surface morphology of formed parts, due to the shear induced crystallisation, could be described as a surface layer of a polypropylene rich region, beneath which a rubber (particles) rich layer lies.

Surface stability of such multiphase polymer systems (polypropylene/rubber) depends very strongly on the phase separation behaviour in the surface region. The role of interface management between polypropylene and rubber phases in this region e.g. control of miscibility between the components is a major factor affecting the ability of the moulded part to resist surface damage caused by external forces. Stresses applied to the polypropylene/rubber part in form of compressive shearing events, e.g. scratches, gouges etc. often result in cohesive debondment due to the week phase adhesion of the systems appearing in form of "ripping" of the surface region (10-100 μm). The cohesive failure is a result of improperly controlled phase bounding arising by incompatibility between two polymers (Ryntz, *ACS Symp. Ser.* 805 (2002), 266).

There exists a continuing need for new polypropylene compositions for injection moulding of automobile exterior parts, where the compositions or the injection moulded parts produced therefrom have to fulfill the following requirements simultaneously: High impact strength, high stiffness, high elasticity, high surface stability.

SUMMARY OF THE INVENTION

The above object has been achieved by a polypropylene composition comprising

A) 70-99 parts per weight of a heterophasic propylene copolymer comprising 60-90 wt % of a matrix phase comprising a propylene homopolymer having an isotacticity IRτ≧0.970, and 10-40 wt % of an elastomeric copolymer comprising 20-55 wt % of ethylene and 80-45 wt % of one or more $C_3$-$C_8$ α-olefins, B) 1-30 parts per weight of a further elastomeric copolymer comprising an ethylene-α-olefin elastomer, with more than 65 wt % of ethylene and up to 35 wt % of one or more $C_3$-$C_8$ α-olefins, where a disperse phase is comprised of the elastomeric copolymers, and C) 3-25 parts per weight of an inorganic filler, the polypropylene composition having
- a Charpy notched impact strength according to ISO 179/1 eA at +23° C. of ≧55.0 kJ/m²,
- a Charpy notched impact strength according to ISO 179/1 eA at −20° C. of ≧7.0 kJ/m²,
- a tensile modulus according to ISO 527-3 of ≧1200 MPa
- elasticity (elongation at break) according to ISO 527-3 of ≧80% and
- an average failure length (AFL), which is determined by injection moulding the composition into a test specimen having the dimensions of 150×80×2 mm, creating surface defects by directing a water jet (76 bar; 60° C., flat spray nozzle ¼ PMEG 2506) from a distance of 8 cm (from nozzle to specimen surface) at the specimen surface at three different locations at a distance of 6 cm from each location and for 60 sec each, measuring the length of each surface defect and calculating the average value of the three locations, of ≦10 mm.

The new compositions shall be used for injection moulding. The MFR of the compositions shall not exceed 15 g/10 min, preferred are MFR-values of s 8 g/10 min. A Charpy notched impact strength according to ISO 179/1 eA at +23° C. of ≧55.0 kJ/m², better of ≧60 kJ/m² and, still better, of ≧65.0 kJ/m² is considered as "high impact strength". Minimum values for the Charpy notched impact strength according to ISO 179/1eA at −20° C. are ≧7.0 kJ/m², better >8.0 kJ/m² and still better, >8.5 kJ/m². Stiffness is considered to be high with tensile moduli according to ISO 527-3 of ≧1200 MPa. Still higher values are of course more preferable. Elasticity is considered to be high when elongation at break according to ISO 527-3 is ≧80%, preferably ≧100%. The surface stability of injection moulded parts is considered to be high, when the average failure length (AFL), determined according to the procedure described in the experimental section, is ≦10 mm, preferably ≦8 mm. Still more preferred are AFL values ≦5 mm.

It has surprisingly been found, that polypropylene compositions containing the components A, B and C which are then modified using specific organic peroxides will result in new polypropylene compositions where the previous property profile regarding impact strength, stiffness and elasticity is largely retained, but where also a sudden increase in surface stability is observed.

The new polypropylene compositions are characterised by simultaneous high levels of impact strength, stiffness, elasticity and surface stability. The high surface stability is believed to be due to an improved adhesion between matrix phase and disperse phase.

The new polypropylene compositions are obtained by treating compositions containing the components A, B and C with specific organic peroxides.

The matrix phase of the heterophasic propylene copolymer comprises a propylene homopolymer. The matrix phase is present in an amount of 60-90 wt %, preferably 70-20 wt %, based on the total amount of heterophasic propylene copolymer.

The homopolymer part of the heterophasic propylene copolymer preferably has an isotacticity IRτ of ≧0.970, preferably 0.970-0.995.

The IRτ of a propylene polymer is determined by Infrared spectroscopy and calculated as described in EP 0 277 514 A2 on page 3 (especially column 3, line 37 to column 4, line 30) and page 5 (column 7, line 53 to column 8, line 11).

The elastomeric copolymer which comprises the disperse phase of the heterophasic copolymer and which also comprises—together with the further elastomeric copolymer—a disperse phase of the entire composition, is present in an amount of from 10-40 wt %, preferably 20-30 wt %, based on the total amount of heterophasic propylene copolymer.

The elastomeric copolymer is comprised of from 20-55 wt % preferably 30-50 wt % of ethylene and 80-45 wt % preferably 70-50 wt % of one or more $C_3$-$C_8$ α-olefins. The α-olefin is preferably selected from the list of propylene, 1-butene, 1-pentene, 4-methyl-1-pentene, 1-hexene, 1-heptene and 1-octene, where propylene, 1-butene and 1-octene are particularly preferred.

A further elastomeric copolymer is present in an amount of from 1-30 parts per weight. The further elastomeric copolymer comprises an ethylene-α-olefin elastomer, which comprises more than 65 wt % of ethylene and up to 35 wt % of one or more $C_3$-$C_8$ α-olefins. As with the first elastomeric copolymer, the α-olefin is preferably selected from the list of propylene, 1-butene, 1-pentene, 4-methyl-1-pentene, 1-hexene, 1-heptene and 1-octene, where propylene, 1-butene and 1-octene are particularly preferred.

The polypropylene composition comprises 3-25 parts per weight of an inorganic filler. Preferred as inorganic filler are talc, mica, wollastonite and chalk.

According to a preferred embodiment, the polypropylene composition comprises 5-20 parts per weight of inorganic filler.

Inorganic filler can be added to the composition before and/or during the modification with the organic peroxides. It is preferred to add at least a substantial amount, e.g. at least about 50%, of the inorganic filler before and/or during the modification treatment. It is particularly preferred to add the entire amount of inorganic filler before and/or during the modification treatment.

DETAILED DESCRIPTION OF THE INVENTION

According to a preferred embodiment of the present invention, the polypropylene composition comprises A) 75-85 parts per weight of the heterophasic propylene copolymer, B) 5-15 parts per weight of the further elastomeric copolymer and C) 5-20 parts per weight of the inorganic filler.

A particularly advantageous property profile is achievable with the above composition, i.e. with the above concentrations of heterophasic and further elastomeric copolymer and when the entire amount of filler is added to the composition before/during the modification treatment.

According to a further advantageous embodiment the polypropylene composition comprises from 0.01 to 10 parts per weight based on the weight of the polypropylene composition of a chemically bound bifunctionally unsaturated monomer and/or multifunctionally unsaturated low molecular weight polymer having a molecular weight $M_n \leq 10000$ g/mol. synthesised from one and/or more unsaturated monomers.

"Bifunctionally or multifunctionally unsaturated" as used above means the presence of two or more non-aromatic double bonds, as in e.g. divinylbenzene or cyclopentadiene or polybutadiene. Only such bi- or multifunctionally unsaturated compounds are used which can be polymerised with the aid of free radicals. The unsaturated sites in the bi- or multifunctionally unsaturated compounds are in their chemically bound state not actually "unsaturated", because the double bonds are each used for a covalent bond to the polymer chains of the matrix polymer and/or the elastomeric copolymer.

Reaction of the bifunctionally unsaturated monomer and/or multifunctionally unsaturated low molecular weight polymer having a molecular weight $M_n \leq 10000$ g/mol, synthesised from one and/or more unsaturated monomers with the heterophasic polymer may be performed in the presence of a free radical forming agent, e.g. a thermally decomposable peroxide, ionising radiation or microwave radiation.

The bifunctionally unsaturated monomers may be
divinyl compounds, such as divinylaniline, m-divinylbenzene, p-divinylbenzene, divinylpentane and divinylpropane;
allyl compounds, such as allyl acrylate, allyl methacrylate, allyl methyl maleate and allyl vinyl ether;
dienes, such as 1,3-butadiene, chloroprene, cyclohexadiene, cyclopentadiene, 2,3-dimethylbutadiene, heptadiene, hexadiene, isoprene and 1,4-pentadiene;
aromatic and/or aliphatic bis(maleimide) and bis(citraconimide) compounds and mixtures of these unsaturated monomers.

The multifunctionally unsaturated low molecular weight polymer having a molecular weight $M_n \leq 10000$ g/mol may be synthesised from one or more unsaturated monomers. Examples of such low molecular weight polymers are
polybutadienes, especially where the different microstructures in the polymer chain, i.e. 1,4-cis, 1,4-trans and 1,2-(vinyl) configuration are predominantly in the 1,2-(vinyl) configuration
copolymers of butadiene and styrene having 1,2-(vinyl) configuration in the polymer chain.

In the polypropylene composition of the invention the chemically bound bifunctionally unsaturated monomer and/or multifunctionally unsaturated low molecular weight polymer act as coupling agent between the matrix polymer and the elastomeric copolymers of the disperse phase. It is believed that those molecules, which—with one of their functionalities—are bound to a polymer molecule of the matrix polymer and—with their second or one of their further functionalities—are bound to a polymer molecule belonging to the disperse phase, effect the coupling action and thus promote dispersion of the elastomeric copolymers within the matrix phase.

Preferred bifunctionally unsaturated monomers are 1,3-butadiene, isoprene, dimethyl butadiene and divinylbenzene.

Preferred low molecular weight polymer is polybutadiene, in particular a polybutadiene having more than 50 wt % of the butadiene in the 1,2-(vinyl) configuration.

The polypropylene composition may contain more than one bifunctionally unsaturated monomer and/or low molecular weight polymer.

In connection with the above it is particularly preferred that the modified polypropylene composition of the invention contains from 0.1 to 3 wt % based on the weight of the composition of a chemically bound bifunctionally unsaturated monomer and/or multifunctionally unsaturated low molecular weight polymer having a molecular weight $M_n \leq 10000$ g/mol.

While measurable effects are already observed with small concentrations of bifunctionally unsaturated monomer and/or multifunctionally unsaturated low molecular weight polymer (depending also on the nature of the monomer and/or polymers) it is preferred that the polypropylene composition contains at least 0.1 wt % of the bifunctionally unsaturated monomer and/or multifunctionally unsaturated polymer.

With increasing amounts of bifunctionally unsaturated monomer and/or multifunctionally unsaturated polymer, an influence on the mechanical parameters of the polypropylene composition makes itself noticeable, which is not related to the coupling effect. It is therefore preferred that the modified polypropylene composition contains not more than 3 parts per weight of the bifunctionally unsaturated monomer and/or multifunctionally unsaturated polymer.

A further object is a method for producing the polypropylene compositions of the invention.

According to a basic embodiment, the polypropylene compositions are prepared by homogenising an educt mixture comprising A) 70-99 parts per weight of a heterophasic propylene copolymer comprising 60-90 wt % of a matrix phase comprising a propylene homopolymer having an isotacticity $IR\tau \geqq 0.970$, and 10-40 wt % of an elastomeric copolymer comprising 20-55 wt % of ethylene and 80-45 wt % of one or more $C_3$-$C_8$ α-olefins, B) 1-30 parts per weight of a further elastomeric copolymer comprising an ethylene-α-olefin elastomer, with more than 65 wt % of ethylene and up to 35 wt % of one or more $C_3$-$C_8$ α-olefins, C) 3-25 parts per weight of an inorganic filler, and D) 0.05-3 parts per weight of an organic peroxide having a half life time t(½) at 110° C. of >6 min and a half life time t(½) at 150° C. of <6 min the mixture being in a molten state, heating the melt to 220-250° C. to remove unreacted compounds and decomposition products, cooling and pelletising.

Peroxides which are thermally decomposable upon the conditions of heating and melting the polymer/peroxide mixture and which meet the requirement of having a half life time t(½) at 110° C. of >6 min and a half life time t(½) at 150° C. of <6 min are suitable. The following organic peroxides are suitable for the above process:

Dibenzoyl peroxide, tert-Butyl peroxy-2-ethylhexanoate, tert-Amyl peroxy-2-ethylhexanoate, tert-Butyl peroxydiethylacetate, 1,4-Di(tert-butylperoxycarbo)cyclohexane, tert-Butyl peroxyisobutyrate, 1,1-Di(tert-butylperoxy)-3,3,5-trimethyl-cyclohexane, Methyl isobutyl ketone peroxide, 2,2-Di(4,4-di(tert-butylperoxy)cyclohexyl)propane, 1,1-Di(tert-butylperoxy)cyclohexane, tert-Butyl peroxy-3,5,5-trimethylhexanoate, tert-Amylperoxy 2-ethylhexyl carbonate, 2,2-Di(tert-butylperoxy)butane, tert-butylperoxy isopropyl carbonate, tert-Butylperoxy 2-ethylhexyl carbonate, tert-Butyl peroxyacetate, tert-butyl peroxybenzoate, Di-tert-amyl peroxide and mixtures of these organic peroxides.

It has been observed, that peroxides used in conventional degradation processes exert different modes of action. One effect is, that the peroxides effect a breakage of the longest chains of the polymer molecules and, consequently, a corresponding decrease in viscosity of the polymer. A second effect is, that peroxide-induced radicals are recombining. Both effects are to a certain extent always present in peroxide induced degradation processes. The actual extent of each effect is influenced by the nature of the peroxide.

For the present invention it is preferred to use peroxides where the second mode of action is increased compared to "pure" degradation peroxides, and preferably where the second mode of action is predominant.

According to a preferred embodiment the employed peroxides are of the above mentioned type and are selected from tert-butylperoxy isopropyl carbonate and tert-butyl peroxybenzoate.

During the homogenisation step the main part of the above described reaction(s) take place. Homogenisation usually takes from 5 to 60 seconds.

After homogenisation the melt is heated to 220-250° C., in order to completely deactivate any remaining peroxide, to remove and deactivate any still unreacted compounds, e.g. radicals, and to remove decomposition products.

It is preferred, that the educt mixture further comprises 0.01-10 parts per weight of bifunctionally unsaturated monomers and/or multifunctionally unsaturated low molecular weight polymer having a molecular weight $M_n \leqq 10000$ g/mol.

According to a more specific embodiment of the general procedure, the polypropylene composition is prepared by mixing A) 70-99 parts per weight of a heterophasic propylene copolymer comprising 60-90 wt % of a matrix phase comprising a propylene homopolymer having an isotacticity $IR\tau \geqq 0.970$, and 10-40 wt % of an elastomeric copolymer comprising 20-55 wt % of ethylene and 80-45 wt % of one or more $C_3$-$C_8$ α-olefins, with B) 1-30 parts per weight of a further elastomeric copolymer comprising an ethylene-α-olefin elastomer, with more than 65 wt % of ethylene and up to 35 wt % of one or more $C_3$-$C_8$ α-olefins, and C) 3-25 parts per weight of an inorganic filler, and heating and melting the mixture, preferably in an extruder, adding from 0.05 to 3 parts per weight of the organic peroxide directly into the polymer melt, homogenising and heating the melt to 220-250° C. to remove unreacted compounds and decomposition products, cooling and pelletising.

The polymers A and B and the filler C may be premixed before they are dosed into the extruder. Alternatively, they may be dosed separately into the extruder.

Alternatively to the procedure above, the polypropylene compositions can also be prepared by dosing the polymer components A) 70-99 parts per weight of a heterophasic propylene copolymer comprising 60-90 wt % of a matrix phase comprising a propylene homopolymer having an isotacticity $IR\tau \geqq 0.970$, and 10-40 wt % of an elastomeric copolymer comprising 20-55 wt % of ethylene and 80-45 wt % of one or more $C_3$-$C_8$ α-olefins, B) 1-30 parts per weight of a further elastomeric copolymer comprising an ethylene-α-olefin elastomer, with more than 65 wt % of ethylene and up to 35 wt % of one or more $C_3$-$C_8$ α-olefins, into a melt mixing device, preferably an extruder, heating and melting the mixture, adding C) 3-25 parts per weight of an inorganic filler into the melt, adding from 0.05 to 3 parts per weight of the organic peroxide directly into the polymer melt, homogenising and heating the melt to 220-250° C. to remove unreacted compounds and decomposition products, cooling and pelletising.

This particular embodiment has the advantage, that the filler can be better dispersed in the polymer, because it is added into the melt. This requires less energy for homogeneously distributing the filler.

If unsaturated monomers and/or polymers are used in one of the latter two procedures, it is preferred to add 0.01-10 parts per weight of bifunctionally unsaturated monomers and/or multifunctionally unsaturated low molecular weight polymer having a molecular weight $M_n \leq 10000$ g/mol into the polymer melt together with the addition of the peroxide and/or during the homogenising step.

It is preferred, that any unsaturated compounds are added before the homogenisation step is completed and before the melt is heated to 220-250° C. for removing unreacted compounds and decomposition products.

According to a still further alternative of the basic embodiment, the polypropylene compositions are produced by dosing the polymer components A) 70-99 parts per weight of a heterophasic propylene copolymer comprising 60-90 wt % of a matrix phase comprising a propylene homopolymer having an isotacticity $IR\tau \geq 0.970$, and 10-40 wt % of an elastomeric copolymer comprising 20-55 wt % of ethylene and 80-45 wt % of one or more $C_3$-$C_8$ α-olefins, B) 1-30 parts per weight of a further elastomeric copolymer comprising an ethylene-1-olefin elastomer, with more than 65 wt % of ethylene and up to 35 wt % of one or more $C_3$-$C_8$ α-olefins, and 0.05 to 3 parts per weight of the organic peroxide into a melt mixing device, preferably an extruder, heating and melting the mixture, adding C) 3-25 parts per weight of an inorganic filler into the melt, homogenising and heating the melt to 220-250° C. to remove unreacted compounds and decomposition products, cooling and pelletising.

In this specific embodiment, it is preferred to add the 0.01-10 parts per weight of bifunctionally unsaturated monomers and/or multifunctionally unsaturated low molecular weight polymer having a molecular weight $M_n \leq 10000$ g/mol into the melt mixing device together with the polymer components A and B.

If the unsaturated monomer and/or polymer is added into the polymer melt, it is preferably solvatised in an organic solvent, e.g. acetone, and the solution is injected into the polymermelt, e.g. into the extruder.

Alternatively, the unsaturated monomer and/or polymer, if for example in a liquid state, are absorbed in a polymer powder and are then added into the polymer melt in form of solid pellets.

Alternatively, the bifunctionally unsaturated monomer, if for example in a gaseous state, can be directly injected into the polymer melt without the aid of a solvent. Optionally, the bifunctionally unsaturated monomer can be applied as mixture with inert gases, e.g. nitrogen.

The educt heterophasic copolymer may be produced by multistage process polymerisation of propylene and ethylene and/or an α-olefin such as bulk polymerisation, gas phase polymerisation, slurry polymerisation, solution polymerisation or combinations thereof using conventional catalysts. Those processes are well known to one skilled in the art.

A preferred process is a combination of a bulk slurry loop reactor(s) and gas phase reactor(s). The matrix polymer can be made either in loop reactors or in a combination of loop and gas phase reactor.

The polymer produced in this way is transferred into another reactor and the disperse phase, an ethylene/α-olefin rubber, is polymerised. Preferably this polymerisation step is done in a gas phase polymerisation.

A suitable catalyst for the polymerisation of the educt heterophasic propylene copolymer is any stereospecific catalyst for propylene polymerisation which is capable of polymerising and copolymerising propylene and comonomers at a temperature of 40 to 110° C. and at a pressure form 10 to 100 bar. Ziegler Natta catalysts as well as metallocene catalysts are suitable catalysts.

One skilled in the art is aware of the various possibilities to produce such heterophasic systems and will simply find out a suitable procedure to produce suitable educt heterophasic polyolefin compositions which are used in the present invention.

The educt heterophasic polyolefin composition may also be produced by mixing and melt blending a propylene homopolymer with an ethylene rubber copolymer.

An ethylene α-olefin elastomeric copolymer may be produced by known polymerisation processes such as solution, suspension and gas-phase polymerisation using conventional catalysts. Ziegler Natta catalysts as well as metallocene catalysts are suitable catalysts.

A widely used process is the solution polymerisation. Ethylene, α-olefin and catalyst systems are polymerised in an excess of hydrocarbon solvent. Stabilisers and oils, if used, are added directly after polymerisation. The solvent and unreacted monomers are then flashed off with hot water or steam, or with mechanical devolatilisation. The polymer, which is in crumb form, is dried with dewatering in screens, mechanical presses or drying ovens. The crumb is formed into wrapped bales or extruded into pellets.

The suspension polymerisation process is a modification of bulk polymerisation. The monomers and catalyst system are injected into the reactor filled with α-olefin. The polymerisation takes place immediately, forming crumbs of polymer that are not soluble in the α-olefin. Flashing off the α-olefin and comonomer completes the polymerisation process.

The gas-phase polymerisation technology consists of one or more vertical fluidised beds. Monomers and nitrogen in gas form along with catalyst are fed to the reactor and solid product is removed periodically. Heat of reaction is removed through the use of the circulating gas that also serves to fluidise the polymer bed. Solvents are not used, thereby eliminating the need for solvent stripping, washing and drying.

Measurement Methods

MFR

The melt flow rates were measured with a load of 2.16 kg at 230° C. The melt flow rate is that quantity of polymer in grams which the test apparatus standardized to ISO 1133 extrudes within 10 minutes at a temperature of 230° C. under a load of 2.16 kg.

Comonomer contents were measured with Fourier transform infrared spectroscopy (FTIR) calibrated with $^{13}$C-NMR.

Tensile Test

Tensile test was performed according to ISO 527-3 using injection moulded specimens as described in EN ISO 1873-2 (dog bone shape, 3 mm thickness).

Charpy Notched Impact Strength

The Charpy notched impact strength was determined according to ISO 179/1 eA at 23° C. and at −20° C. by using injection moulded test specimens as described in EN ISO 1873-2 (80×10×4 mm).

Average Failure Length (AFL)

AFL was determined by injection moulding the composition into a test specimen having the dimensions of 150×80×2 mm, creating surface defects by directing a water jet (76 bar; 60° C., flat spray nozzle ¼ PMEG 2506, opening angle 25°) using the high pressure cleaner system Limex Ehrle HDE600-24 kW with nozzle ¼ PMEG 2506) from a distance of 8 cm (from nozzle to specimen surface) perpendicularly at the specimen surface at three different locations at a distance of 6 cm from each location and for 60 sec each. The length of each surface defect was measured and average value of the three locations calculated. Nozzles of the above used type are standardised and are available from e.g. Spraying Systems Austria GmbH.

EXAMPLES

The following materials were used for the examples:

Polymer A: Heterophasic copolymer, 80 wt % propylene homopolymer (IRτ=0.972) 20 wt % ethylene-propylene elastomeric copolymer with 38 wt % ethylene MFR (230° C./2.16 kg)=4.0 g/10 min.

Polymer B: elastomeric copolymer, commercially available as Exxelor PE805 from ExxonMobil Chemical having 78 wt % ethylene and 22 wt % propylene MFI (230° C./10 kg)=4.9 g/10 min.

Filler C: Talc A7, commercially available from Lucenac with the particle size distribution according to Sedigraph 5100 of 2.1 μm by d50 and 6.5 μm by d95

Example 1 (E1)

79 wt % of polymer A and 10 w % of polymer B were dosed separately into a twin screw extruder Prism TSE24 40D with a temperature profile 80/200/210/220/220/230/230/220/225/220° C. and a screw speed of 300 rpm. After heating and melting of the polymer mixture (zones 1, 2 and 3), 11 wt % of filler C were added into the polymer melt (zone 4) via a side feeder. A solution of tert-butylperoxy isopropyl carbonate (peroxide 1 in table 1) in acetone (10 wt %) was injected directly into zone 4 of the extruder, achieving a concentration of 0.07 wt % of the peroxide, based on the mixture. The polymer melt/liquid/gas mixture was passed through the extruder, then to intensive devolatilisation, discharged and pelletised.

Examples 2 and 3 were prepared analogously to E1, but using different amounts of peroxide. The concentrations of peroxide in the polymer mixture are given in table 1.

Comparative Example 1 (CE1)

CE1 was prepared analogously to E1, except that no peroxide was injected into the polymer melt. The properties of CE1 therefore are those of the unmodified composition.

Comparative Example 2 (CE2)

CE2 was prepared analogously to E1, except that a solution of 2,5-dimethyl-2,5di(tert-butylperoxy)hexane (peroxide 2 in table 1) in acetone (10 wt %) was injected directly into zone 4 of the extruder, achieving a concentration of 0.07% by weight, based on the mixture.

Comparative Example 3 (CE3)

CE3 was prepared analogously to E2, except that the entire amount of talc was added after the modification treatment was finished.

Comparative Example 4 (CE4)

CE4 was prepared analogously to E2, except that no Polymer B was used.

Comparative Example 5 (CE5)

CE5 was prepared analogously to E2, except that the entire amount of Polymer B was added after the modification treatment was finished.

Comparative Example 6 (CE6)

CE6 was prepared analogously to CE2, except that a different amount of peroxide 2 was used and except that immediately after injection of the peroxide 2, butadiene as bifunctionally unsaturated monomer was injected into the same zone 4 of the extruder, through a second injection port. The concentration of peroxide 2 in the polymer mixture is given in table 1.

Examples 4 to 6 were prepared analogously to Examples 1 to 3, except that immediately after injection of the peroxide, butadiene as bifunctionally unsaturated monomer was injected into the same zone 4 of the extruder, through a second injection port.

The amount of the injected butadiene was chosen to result in a concentration of 0.15 wt % based on the total weight of the modified composition of chemically bound butadiene.

Example 7 (E7) was prepared analogously to Example 5 except that 1,2-polybutadiene as multifunctionally oligomer was injected into zone 4 of the extruder, through a second injection port.

The 1,2-polybutadiene which is used in E7 is commercially available from Sartomer under the grade name Krasol LB2000. It has 65 wt % of the butadiene units in the 1,2-vinyl configuration and a molecular weight $M_n$ of 2100 g/mol.

Example 8 (E8) was prepared analogously to Example 5, except that 1,1'-(methylenedi-4,1-phenylene)bismaleimide as monomer was added in powder form into zone 4 of the extruder using the side feeder.

TABLE 1

|  |  | CE1 | CE2 | CE3 | CE4 | CE5 | CE6 | E1 |
|---|---|---|---|---|---|---|---|---|
| peroxide 1 | [wt %] | — |  | 0.14 | 0.14 | 0.14 |  | 0.07 |
| peroxide 2 | [wt %] |  | 0.07 |  |  |  | 0.14 |  |
| unsatd. compound | [wt %] | — | — | — | — | — | 0.15 | — |
| MFR | [g/10 min] | 3.2 | 5 | 5.5 | 14 | 4.9 | 5 | 4.8 |

TABLE 1-continued

|  |  |  |  |  |  |  |  |  |
|---|---|---|---|---|---|---|---|---|
| NIS (23° C.) | [kJ/m$^2$] | 67.1 | 51.6 | 65.5 | 21.8 | 67.2 | 63.4 | 67.8 |
| NIS (−20° C.) | [kJ/m$^2$] | 8.2 | 6.4 | 8.2 | 5.1 | 8.1 | 6.5 | 8.2 |
| Tensile Modulus | [MPa] | 1425 | 1436 | 1285 | 1500 | 1279 | 1280 | 1390 |
| Elongation at break | [%] | 332 | 161 | 75 | 46 | 122 | 47 | 317 |
| Average Failure Length | [mm] | 23 | 22 | 5 | 4 | 21 | 15 | 7 |

|  |  | E2 | E3 | E4 | E5 | E6 | E7 | E8 |
|---|---|---|---|---|---|---|---|---|
| peroxide 1 | [wt %] | 0.14 | 0.21 | 0.07 | 0.14 | 0.21 | 0.14 | 0.14 |
| peroxide 2 | [wt %] |  |  |  |  |  |  |  |
| unsatd. compound | [wt %] | — | — | 0.15 | 0.15 | 0.15 | 2.0 | 0.15 |
| MFR | [g/10 min] | 6.2 | 10.3 | 3.5 | 4 | 2.9 | 4.5 | 4.3 |
| NIS (23° C.) | [kJ/m$^2$] | 68.7 | 64.7 | 80.4 | 71.2 | 65.3 | 65.7 | 69.9 |
| NIS (−20° C.) | [kJ/m$^2$] | 8.2 | 7.6 | 10.4 | 9.4 | 9 | 8.9 | 9.2 |
| Tensile Modulus | [MPa] | 1304 | 1245 | 1335 | 1261 | 1244 | 1231 | 1271 |
| Elongation at break | [%] | 163 | 131 | 268 | 110 | 108 | 115 | 123 |
| Average Failure Length | [mm] | 3.5 | 4 | 5 | 0 | 1 | 2 | 1 |

The invention claimed is:

1. Polypropylene composition comprising
   A) 70-99 parts by weight of a heterophasic propylene copolymer comprising 60-90 wt % of a matrix phase comprising a propylene homopolymer having an isotacticity IRτ≧0.970, and 10-40 wt % of an elastomeric copolymer comprising 20-55 wt % of ethylene and 80-45 wt % of one or more $C_3$-$C_8$ α-olefins,
   B) 1-30 parts by weight of a further elastomeric copolymer comprising an ethylene-α-olefin elastomer, with more than 65 wt % of ethylene and up to 35 wt % of one or more $C_3$-$C_8$ α-olefins, where a disperse phase is comprised of the elastomeric copolymers, and
   C) 3-25 parts by weight of an inorganic filler, the polypropylene composition having
   a Charpy notched impact strength according to ISO 179/1eA at +23° C. of ≧55.0 kJ/m$^2$,
   a Charpy notched impact strength according to ISO 179/1eA at −20° C. of ≧7.0 kJ/m$^2$,
   a tensile modulus according to ISO 527-3 of ≧1200 Mpa
   elasticity (elongation at break) according to ISO 527-3 of ≧80% and
   an average failure length (AFL), which is determined by injection moulding the composition into a test specimen having the dimensions of 150×80×2 mm, creating surface defects by directing a water jet (76 bar; 60° C., flat spray nozzle 1/4 PMEG 2506) from a distance of 8 cm (from nozzle to specimen surface) at the specimen surface at three different locations at a distance of 6 cm from each location and for 60 sec each, measuring the length of each surface defect and calculating the average value of the three locations, of ≦10 mm.

2. Polypropylene composition according to claim 1, further comprising 5-20 parts by weight of inorganic filler.

3. Polypropylene composition according to claim 2, wherein the polypropylene composition comprises A) 75-85 parts per weight of the heterophasic propylene copolymer, B) 5-15 parts by weight of the further elastomeric copolymer and C) 5-15 parts per weight of the inorganic filler.

4. Polypropylene composition according to one of claims 1 to 3, wherein the polypropylene composition further comprises from 0.01 to 10 parts by weight, based on total weight of the composition, of at least one chemically bound, bifunctionally unsaturated monomer and/or multifunctionally unsaturated low molecular weight polymer having a molecular weight $M_n$≦10000 g/mol.

5. Polypropylene composition according to claim 4, wherein the polypropylene composition comprises one or more of chemically bound butadiene, isoprene, dimethylbutadiene, divinylbenzene and polybutadiene.

6. Method for producing a polypropylene composition according to claim 1 comprising
   homogenising an educt mixture comprising
   A) 70-99 parts by weight of a heterophasic propylene copolymer comprising 60-90 wt % of a matrix phase comprising a propylene homopolymer having an isotacticity IRτ≧0.970, and 10-40 wt % of an elastomeric copolymer comprising 20-55 wt % of ethylene and 80-45 wt % of one or more $C_3$-$C_8$ α-olefins,
   B) 1-30 parts by weight of a further elastomeric copolymer comprising an ethylene-α-olefin elastomer, with more than 65 wt % of ethylene and up to 35 wt % of one or more $C_3$-$C_8$ α-olefins,
   C) 3-25 parts by weight of an inorganic filler, and
   D) 0.05-3 parts by weight of an organic peroxide having a half life time t(½) at 110° C. of >6 min and a half life time t(½) at 150° C. of <6 min the mixture being in a molten state,
   heating the melt to 220-250° C. to remove unreacted compounds and
   decomposition products,
   cooling and pelletising.

7. Method according to claim 6, wherein the educt mixture further comprises 0.01-10 parts by weight of at least one bifunctionally unsaturated monomer and/or multifunctionally unsaturated low molecular weight polymer having a molecular weight $M_n$≦10000 g/mol.

8. Method according to claim 6, comprising
   mixing
   A) 70-99 parts by weight of a heterophasic propylene copolymer comprising 60-90 wt % of a matrix phase comprising a propylene homopolymer having an isotacticity IRτ≧0.970, and 10-40 wt % of an elastomeric copolymer comprising 20-55 wt % of ethylene and 80-45 wt % of one or more $C_3$-$C_8$ α-olefins, with
   B) 1-30 parts by weight of a further elastomeric copolymer comprising an ethylene-α-olefin elastomer, with more than 65 wt % of ethylene and up to 35 wt % of one or more $C_3$-$C_8$ α-olefins, and
   C) 3-25 parts by weight of an inorganic filler, and heating and melting the mixture,
   adding from 0.05 to 3 parts by weight of the organic peroxide directly into the polymer melt,
   homogenising and heating the melt to 220-250° C. to remove unreacted compounds and decomposition products,
   cooling and pelletising.

9. Method according to claim 6, comprising dosing the polymer components
   A) 70-99 parts by weight of a heterophasic propylene copolymer comprising 60-90 wt % of a matrix phase comprising a propylene homopolymer having an isotacticity IRτ≧0.0970, and 10-40 wt % of an elastomeric copolymer comprising 20-55 wt % of ethylene and 80-45 wt % of one or more $C_3$-$C_8$ α-olefins,
   B) 1-30 parts by weight of a further elastomeric copolymer comprising an ethylene-α-olefin elastomer, with more than 65 wt % of ethylene and up to 35 wt % of one or more $C_3$-$C_8$ α-olefins, into a melting mixing device,
heating and melting the mixture,
adding C) 3-25 parts by weight of an inorganic filler into the melt,
   adding from 0.05 to 3 parts per weight of the organic peroxide directly into the polymer melt,
   homogenising and heating the melt to 220-250° C. to remove unreacted compounds and decomposition products,
cooling and pelletising.

10. Method according to claim 8 or 9, further comprising adding 0.01-10 parts by weight of at least one bifunctionally unsaturated monomer and/or multifunctionally unsaturated low molecular weight polymer having a molecular weight $M_n$≦10000 g/mol into the polymer melt together with the addition of the peroxide and/or during the homogenising step.

11. Method according to claim 6, comprising dosing the polymer components
   A) 70-99 parts by weight of a heterophasic propylene copolymer comprising 60-90 wt % of a matrix phase comprising a propylene homopolymer having an isotacticity IRτ≧0.970, and 10-40 wt % of an elastomeric copolymer comprising 20-55 wt % of ethylene and 80-45 wt % of one or more $C_3$-$C_8$ α-olefins,
   B) 1-30 parts by weight of a further elastomeric copolymer comprising an ethylene-α-olefin elastomer, with more than 65 wt % of ethylene and up to 35 wt % of one or more $C_3$-$C_8$ α-olefins,
and 0.05 to 3 parts by weight of the organic peroxide
into a melt mixing device,
heating and melting the mixture,
adding C) 3-25 parts by weight of an inorganic filler into the melt, homogenising and heating the melt to 220-250° C. to remove unreacted compound and decomposition products, cooling and pelletising.

12. Method according to claim 11, further comprising adding 0.01-10 parts by weight of at least one bifunctionally unsaturated monomer and/or multifunctionally unsaturated low molecular weight polymer having a molecular weight $M_n$≦10000 g/mol into the melt mixing device together with the polymer components A and B.

13. Method according to claim 8, 9 or 11, wherein the melt mixing device is an extruder.

* * * * *